United States Patent
Kerr

(10) Patent No.: US 11,511,196 B2
(45) Date of Patent: *Nov. 29, 2022

(54) PREDICTIVE DATA PRELOADING

(71) Applicant: Roblox Corporation, San Mateo, CA (US)

(72) Inventor: John Kerr, Newport Beach, CA (US)

(73) Assignee: Roblox Corporation, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/343,656

(22) Filed: Jun. 9, 2021

(65) Prior Publication Data

US 2021/0299577 A1  Sep. 30, 2021

Related U.S. Application Data

(63) Continuation of application No. 16/442,328, filed on Jun. 14, 2019, now Pat. No. 11,033,824.

(51) Int. Cl.
| | |
|---|---|
| *A63F 13/00* | (2014.01) |
| *A63F 9/24* | (2006.01) |
| *A63F 13/79* | (2014.01) |
| *A63F 13/45* | (2014.01) |
| *A63F 13/358* | (2014.01) |
| *A63F 13/77* | (2014.01) |
| *H04L 67/131* | (2022.01) |

(52) U.S. Cl.
CPC ............ *A63F 13/79* (2014.09); *A63F 13/358* (2014.09); *A63F 13/45* (2014.09); *A63F 13/77* (2014.09); *A63F 2300/534* (2013.01); *A63F 2300/5546* (2013.01); *A63F 2300/636* (2013.01); *H04L 67/131* (2022.05)

(58) Field of Classification Search
CPC ........ A63F 13/358; A63F 13/45; A63F 13/48; A63F 13/70; A63F 13/73; A63F 13/77; A63F 13/79

See application file for complete search history.

(56) References Cited

U.S. PATENT DOCUMENTS 9,079,108 B2 * 7/2015 Kruglick ................. A63F 13/00
9,336,483 B1   5/2016 Abeysooriya et al.
(Continued)

OTHER PUBLICATIONS

WIPO, International Search Report and Written Opinion in International Application No. PCT/US2019/052804, dated Dec. 11, 2019, 9 pages.

(Continued)

*Primary Examiner* — Milap Shah
(74) *Attorney, Agent, or Firm* — IP Spring

(57) ABSTRACT

Methods, systems, and computer readable media for predictive preloading of game data are described. In some implementations, a method can include using a machine learning model of player data to predict which games (or game-related data assets) to begin preloading prior to a user making a game selection. Once the user makes a selection, any preloading not related to the selection can be terminated. Thus, during the time period when the user is viewing available game selections, a given number of selections can begin to be preloaded based on predictions from the machine learning model. The preloading can help reduce latency from game selection by the user to game start time.

19 Claims, 6 Drawing Sheets

(56) References Cited

U.S. PATENT DOCUMENTS

| | | | |
|---|---|---|---|
| 9,588,648 B2* | 3/2017 | Li | G06Q 30/06 |
| 9,680,945 B1* | 6/2017 | Treves | G09B 7/04 |
| 10,376,784 B2* | 8/2019 | Chhaochharia | H04L 67/2842 |
| 11,033,824 B2* | 6/2021 | Kerr | A63F 13/358 |
| 2008/0113811 A1* | 5/2008 | Linard | G07F 17/323 |
| | | | 709/204 |
| 2009/0093290 A1 | 4/2009 | Lutnick et al. | |
| 2013/0137518 A1* | 5/2013 | Lucas | A63F 13/79 |
| | | | 463/42 |
| 2013/0184070 A1* | 7/2013 | Gadher | G07F 17/3227 |
| | | | 463/29 |
| 2013/0303274 A1* | 11/2013 | Gadher | G07F 17/3209 |
| | | | 463/29 |
| 2015/0141152 A1 | 5/2015 | Justice et al. | |
| 2016/0256784 A1 | 9/2016 | Breed et al. | |
| 2016/0361644 A1* | 12/2016 | Liu | H04L 67/025 |
| 2017/0053032 A1* | 2/2017 | Liongosari | G06F 21/6227 |
| 2017/0246539 A1* | 8/2017 | Schwartz | A63F 13/46 |
| 2017/0259177 A1* | 9/2017 | Aghdaie | G06Q 30/02 |
| 2017/0282063 A1 | 10/2017 | Krishnamurthy | |
| 2018/0015370 A1* | 1/2018 | Sorek | A63F 13/67 |
| 2018/0243656 A1* | 8/2018 | Aghdaie | A63F 13/79 |
| 2018/0293697 A1 | 10/2018 | Ray et al. | |
| 2019/0155622 A1 | 5/2019 | Chen | |
| 2019/0244137 A1* | 8/2019 | Malan | A63F 13/67 |
| 2019/0251603 A1* | 8/2019 | Jaatinen | G06N 3/0454 |
| 2019/0278870 A1* | 9/2019 | Novielli | G06N 20/00 |

OTHER PUBLICATIONS

USPTO, Final Office Action for U.S. Appl. No. 16/442,328, dated Dec. 17, 2020, 10 pages.

USPTO, Notice of Allowance for U.S. Appl. No. 16/442,328, dated Feb. 19, 2021, 6 pages.

USPTO, Non-final Office Action for U.S. Appl. No. 16/442,328, dated Jul. 14, 2020, 19 pages.

\* cited by examiner

PREDICTIVE DATA PRELOADING

CROSS REFERENCE TO RELATED APPLICATIONS

The present application is a continuation of U.S. Patent application Ser. No. 16/442,328, filed on Jun. 14, 2019, entitled "Predictive Data Preloading," the entire contents of which are hereby incorporated by reference herein.

FIELD

This disclosure generally relates to the field of computerized gaming platforms and, in particular, to methods, systems, and computer readable media to perform predictive game data preloading.

BACKGROUND

Some online gaming platforms allow users to create content, connect with each other, interact with each other (e.g., within a game) and share information with each other via the Internet. Users of online gaming platforms may participate in multiplayer gaming environments in which games or parts of games have been created by other users.

When users search through user generated content (e.g., games, items for games, etc.) or other content, a search engine may return search results based on data such as popularity in terms of numbers of downloads, rating by users, etc. A user can select a game or item from among the search results. User experience may be improved by reducing latency from game selection time to game start time. Accordingly, there may exist a need for reducing latency of game start time following game selection.

Some implementations were conceived in light of the above-mentioned needs, among other things.

SUMMARY

Some implementations provide predictive preloading of game data.

According to one aspect, a computer-implemented method to preload one or more game options by a gaming platform is provided; the method comprising: receiving, from a player device and by the gaming platform, a game search request; providing player data from the gaming platform and one or more games that match the game search request as input to a trained machine learning model; obtaining, as output of the trained machine learning model, one or more game options to preload by the gaming platform, the one or more game options being at least one of the one or more games; and causing the player device to preload at least a portion of at least one of the one or more game options prior to receiving user selection input of a particular game of the one or more games, wherein the preloading is performed based upon one or more of: processor utilization, memory utilization, or communications utilization of the player device.

In some implementations, the causing the player device to preload comprises: causing preloading to start at the player device, wherein the preloading includes loading one or more resources corresponding to the one or more game options in a memory of the player device; receiving, from the player device, an indication that a termination condition has been met; and in response to the indication, causing termination of the loading of the one or more resources at the player system.

In some implementations, the termination condition includes receiving the user selection input from the player system, and wherein the causing termination includes termination of loading of game options that do not match a game option selection of the user selection input.

In some implementations, the termination condition includes receiving user input indicative of a change in available game options of the one or more game options, and wherein the causing termination includes termination of loading of game options that do not match the change in the available game options.

In some implementations, the termination condition includes receiving a new game search request, wherein the causing termination includes termination of loading of game options responsive to receiving the new game search request, and wherein the method further includes causing the player device to preload at least a portion of one or more game options associated with the new game search request prior to receiving user selection input of a particular game.

In some implementations, the termination condition is any of one or more of: preloading of a predetermined number of the one or more game options, exceeding a predetermined amount of processor utilization at the player device, consumption of a predetermined amount of memory at the player device, or consumption of a threshold amount of a network resource at the player device.

In some implementations, the one or more game options include one or more available games within the gaming platform that are selectable by a player associated with the player device.

In some implementations, the one or more game options include one or more available game resources within a particular game in the gaming platform that are selectable by a player associated with the player device.

In some implementations, the method further comprises presenting a graphical user interface (GUI) to display the one or more game options selectable by a player within the gaming platform, wherein: causing the player device to preload is performed prior to presenting the GUI to the player within the gaming platform; causing the player device to preload is performed subsequent to presenting the GUI to the player within the gaming platform; or causing the player device to preload is performed while presenting the GUI and prior to receiving the user selection input.

In some implementations, the player data includes one or more of: player gender, player age, player geographic region, player language, player experience on the gaming platform, player purchase history on the gaming platform, or player activity history on the gaming platform.

According to another aspect, a computer-implemented method to train a machine learning model to predict game options to preload by a gaming platform is provided; the method comprising: receiving training data that includes player data corresponding to a player and one or more previously selected game options that was previously selected by the player in the gaming platform, wherein the one or more previously selected game options were selected from one or more available game options; and training the machine learning model to predict game options to preload, wherein the training comprises: providing the player data and the one or more available game options as input to the machine learning model; obtaining, as output of the machine learning model, one or more predicted game options; comparing the one or more predicted game options with the one or more previously selected game options; and adjusting one or more parameters of the machine learning model based on the comparing.

In some implementations, the training comprises one or more of: supervised learning or semi-supervised learning techniques.

In some implementations, the player data comprises a feature vector that is computed based on two or more of: player demographic information, player cohort data, player history, player location, or player game level.

In some implementations, the training is performed until a value of a loss function meets a predetermined criterion, and wherein the loss function is a function of the predicted game options and the previously selected game options.

In some implementations, the machine learning model is a neural network, and wherein the method further comprises: determining a cohort that the player is associated with; and training the neural network, with additional player data corresponding to additional players from the cohort, to predict one or more game options to preload.

According to yet another aspect, a non-transitory computer-readable medium with instructions stored thereon that, responsive to execution by a processing device, causes the processing device to perform operations is provided; the operations including: receiving, from a player device and by a gaming platform, a game search request; providing player data from the gaming platform and one or more games that match the game search request as input to a trained machine learning model; obtaining, as output of the trained machine learning model, one or more game options to preload by the gaming platform, the one or more game options being at least one of the one or more games; and causing the player device to preload at least a portion of at least one of the one or more game options prior to receiving user selection input of a particular game of the one or more games, wherein the preloading is performed based upon one or more of: processor utilization, memory utilization, or communications utilization of the player device.

In some implementations, the causing the player device to preload comprises: causing preloading to start at the player device, wherein the preloading includes loading one or more resources corresponding to the one or more game options in a memory of the player device; receiving, from the player device, an indication that a termination condition has been met; and in response to the indication, causing termination of the loading of the one or more resources at the player system.

In some implementations, the termination condition includes receiving the user selection input from the player system, and wherein the causing termination includes termination of loading of game options that do not match a game option selection of the user selection input.

In some implementations, the one or more game options include one or more available games within the gaming platform that are selectable by a player associated with the player device.

In some implementations, the one or more game options include one or more available game resources within a particular game in the gaming platform that are selectable by a player associated with the player device.

DETAILED DESCRIPTION

Online gaming platforms (also referred to as "user-generated content platforms" or "user-generated content systems") offer a variety of ways for users to interact with one another. For example, users of an online gaming platform may create games or other content or resources (e.g., characters, graphics, items for game play within a virtual world, etc.) within an online gaming platform. Users of an online gaming platform may also search for games or other content.

Users of an online gaming platform may work together towards a common goal, share various virtual gaming items, send electronic messages to one another, and so forth. Users of an online gaming platform may play games using characters. An online gaming platform may also allow users of the platform to communicate with each other.

Online gaming platforms can provide a virtual three-dimensional environment in which users can play an online game. In order to help enhance the entertainment value of an online game, the online gaming platform can provide a search engine for games, game content, or other game-related resources.

Some implementations can include methods, systems, and computer readable media for predictive preloading of data such as games, game content, or other game-related data resources. For example, search results from the search engine can be displayed to a user via a graphical user interface (or GUI) for the user to make a selection. In some implementations, a method can include using a machine learning model trained based on player cohort behavior to predict which games (or game-related data assets) to begin preloading prior to a user making the selection. Once the user makes a selection, any preloading not related to the selection can be terminated. Thus, during the time period when the user is viewing available game selections, one or more available game options can begin to be preloaded based on predictions from the machine learning model. The preloading can reduce latency from game selection by the user to game start time.

Figure 1:
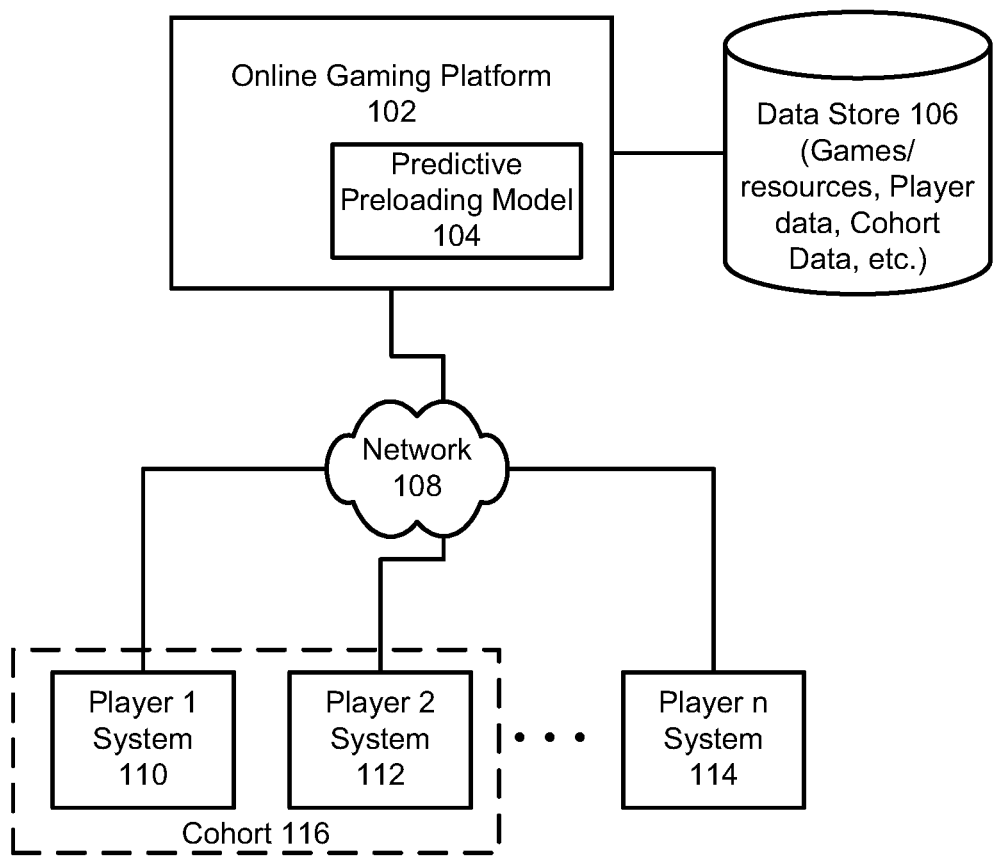
FIG. 1 is a diagram of an example game system architecture to predictively preload game data in accordance with some implementations.

FIG. 1 illustrates an example game system architecture 100, in accordance with some implementations of the disclosure. The system architecture 100 (also referred to as "system" herein) includes an online gaming platform 102, a predictive preloading model 104, a data store 106, a network 108, a first player system 110, a second player system 112, and an nth player system 114.

The data store 106 can be configured to store games and game-related data, player data, cohort data, etc. System architecture 100 is provided for illustration, rather than limitation. In some implementations, the system architecture 100 may include the same, fewer, more, or different elements configured in the same or different manner as that shown in FIG. 1.

In some implementations, network 108 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a Long Term Evolution (LTE) network), routers, hubs, switches, server computers, or a combination thereof.

In one implementation, the data store 106 may be a non-transitory computer readable medium or memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

In some implementations, the online gaming platform 102 can include a server having one or more computing devices (e.g., a cloud computing system, a rackmount server, a server computer, cluster of physical servers, etc.). In some implementations, a server may be included in the online gaming platform 102, be an independent system, or be part of another system or platform.

In some implementations, the online gaming platform 102 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the online gaming platform 102 and to provide a user with access to the online gaming platform 102. The online gaming platform 102 may also include a web site (e.g., a webpage) or application back-end software that may be used to provide a user with access to content provided by the online gaming platform 102. For example, users may access the online gaming platform 102 using one or more applications executing on respective player systems (e.g., 110-114). The applications executing on player systems can include web browsers, plug-ins or add-ons to extend functionality of a web browser, etc.

In some implementations, the online gaming platform 102 may be a type of social network providing connections between users or a type of user-generated content system that allows users (e.g., end-users or consumers) to communicate with other users on the online gaming platform 102, where the communication may include voice chat (e.g., synchronous and/or asynchronous voice communication), video chat (e.g., synchronous and/or asynchronous video communication), or text chat (e.g., synchronous and/or asynchronous text-based communication). In some implementations of the disclosure, a "user" or "player" may be represented as a single individual. However, other implementations of the disclosure encompass a "user" (e.g., creating user) being an entity controlled by a set of users or an automated source. For example, a set of individual users federated as a community or group in a user-generated content system may be considered a "user."

In some implementations, the online gaming platform 102 may be a virtual gaming platform. For example, the gaming platform may provide single-player or multiplayer games to a community of users that may access or interact with games (e.g., user generated games or other games) using client devices 110-114 via network 108. In some implementations, games (also referred to as "video games," "online games,"  or "virtual games" herein) may be two-dimensional (2D) games, three-dimensional (3D) games (e.g., 3D user-generated games), virtual reality (VR) games, or augmented reality (AR) games, for example. In some implementations, users may search for games and participate in gameplay with other users in one or more games selected from results of the search. In some implementations, a game selected from results of the search may be played in real-time with other users of the game.

In some implementations, gameplay may refer to interaction of one or more players using player systems (e.g., 110-114) within a selected game or the presentation of the interaction on a display or other output device of a player system (e.g., 110-114).

In some implementations, a game can include an electronic file that can be executed or loaded using software, firmware or hardware configured to present the game content (e.g., digital media item) to an entity. In some implementations, a game application may be executed and a game rendered in connection with a game engine. In some implementations, a game may have a common set of rules or common goal, and the environments of a game share the common set of rules or common goal. In some implementations, different games may have different rules or goals from one another.

In some implementations, games may have one or more environments (also referred to as "gaming environments" or "virtual environments" herein) where multiple environments may be linked. An example of an environment may be a three-dimensional (3D) environment. The one or more environments of a game may be collectively referred to a "world" or "gaming world" or "virtual world" or "universe" herein. An example of a world may be a 3D world of a game. For example, a user may build a virtual environment that is linked to another virtual environment created by another user. A character of the virtual game may cross the virtual border to enter the adjacent virtual environment.

It may be noted that 3D environments or 3D worlds use graphics that use a three-dimensional representation of geometric data representative of game content (or at least present game content to appear as 3D content whether or not 3D representation of geometric data is used). 2D environments or 2D worlds use graphics that use two-dimensional representation of geometric data representative of game content.

In some implementations, the online gaming platform 102 can host one or more games and can permit users to interact with the games (e.g., search for games, game-related content, or other content) using a game application executing on respective player systems (e.g., 110-114). Users or players of the online gaming platform 102 may play, create, interact with, or build games, search for games, communicate with other users, create and build objects (e.g., also referred to as "item(s)" or "game objects" or "virtual game item(s)" herein) of games, and/or search for objects. For example, in generating user-generated virtual items, users may create characters, decoration for the characters, one or more virtual environments for an interactive game, or build structures used in a game, among others. In some implementations, users may buy, sell, or trade game virtual game objects, such as in-platform currency (e.g., virtual currency), with other users of the online gaming platform 102. In some implementations, online gaming platform 102 may transmit game content to game applications executing on a respective player system. In some implementations, game content (also referred to as "content" herein) may refer to any data or software instructions (e.g., game objects, game, user information, video, images, commands, media item, etc.) associated with online gaming platform 102 or game applications. In some implementations, game objects (e.g., also referred to as "item(s)" or "objects" or "virtual game item(s)" herein) may refer to objects that are used, created, shared or otherwise depicted in game applications of the online gaming platform 102 or game applications executing on respective player systems. For example, game objects may include a part, model, character, tools, weapons, clothing, buildings, vehicles, currency, flora, fauna, components of the aforementioned (e.g., windows of a building), and so forth.

It may be noted that the online gaming platform 102 hosting games, is provided for purposes of illustration, rather than limitation. In some implementations, online gaming platform 102 may host one or more other game-related data or media items. Game-related data or media items can include, but are not limited to, digital video, digital movies, digital photos, digital music, audio content, melodies, website content, social media updates, electronic books, electronic magazines, digital newspapers, digital audio books, electronic journals, web blogs, real simple syndication (RSS) feeds, electronic comic books, software applications, etc. In some implementations, a media item may be an electronic file that can be executed or loaded using software, firmware or hardware configured to present the digital media item to an entity.

In some implementations, a game may be associated with a particular user or a particular group of users (e.g., a private game), or made widely available to users of the online gaming platform 102 (e.g., a public game). In some implementations, where online gaming platform 102 associates one or more games with a specific user or group of users, online gaming platform 102 may associated the specific user(s) with a game using user account information (e.g., a user account identifier such as username and password).

In some implementations, the online gaming platform 102 or player systems (e.g., 110-114) may include a game engine or game application. The game engine can include a game application. In some implementations, the game engine may be used for the development or execution of games. For example, the game engine may include a rendering engine ("renderer") for 2D, 3D, VR, or AR graphics, a physics engine, a collision detection engine (and collision response), sound engine, scripting functionality, animation engine, artificial intelligence engine, networking functionality, streaming functionality, memory management functionality, threading functionality, scene graph functionality, or video support for cinematics, among other features. The components of the game engine may generate commands that help compute and render the game (e.g., rendering commands, collision commands, physics commands, etc.). In some implementations, the game applications executing on player systems may work independently, in collaboration with the game engine of online gaming platform 102, or a combination of both.

In some implementations, both the online gaming platform 102 and player systems (e.g., 110-114) can execute a game engine. The online gaming platform 102 can use a game engine within the platform to perform some or all the game engine functions (e.g., generate physics commands, rendering commands, etc.), or may offload some or all of the game engine functions to a game engine executing on a player system.

In some implementations, each game may have a different ratio between the game engine functions that are performed on the online gaming platform 102 and the game engine functions that are performed on the player systems. For example, the game engine of the online gaming platform 102 may be used to generate physics commands in cases where there is a collision between at least two game objects, while the additional game engine functionality (e.g., generating rendering commands) may be offloaded to a player system.

In some implementations, the ratio of game engine functions performed on the online gaming platform 102 and player system may be changed (e.g., dynamically) based on gameplay conditions. For example, if the number of users participating in gameplay of a particular game exceeds a threshold number, the online gaming platform 102 may perform one or more game engine functions that were previously performed by the player systems.

For example, users may be playing a game on player systems 110-114, and may send control instructions (e.g., user inputs, such as right, left, up, down, user election, or character position and velocity information, etc.) to the online gaming platform 102. Subsequent to receiving control instructions from the player systems (110-114), the online gaming platform 102 may send gameplay instructions (e.g., position and velocity information of the characters participating in the group gameplay or commands, such as rendering commands, collision commands, etc.) to the player systems (110-114) based on control instructions.

For instance, the online gaming platform 102 may perform one or more logical operations (e.g., using a platform game engine) on the control instructions to generate gameplay instruction for the player systems (110-114). In other instances, online gaming platform 102 may pass one or more or the control instructions from one player system (e.g., 110) to another player system (e.g., 112) participating in the game. The player systems 110-114 may use the gameplay instructions and render the gameplay for presentation on respective displays associated with the player systems (110-114).

In some implementations, characters (or game objects generally) are constructed from components, one or more of which may be selected by the user, that automatically join together to aid the user in editing. One or more characters (also referred to as an "avatar" or "model" herein) may be associated with a user where the user may control the character to facilitate a user's interaction with the game. In some implementations, a character may include components such as body parts (e.g., hair, arms, legs, etc.) and accessories (e.g., t-shirt, glasses, decorative images, tools, etc.). In some implementations, body parts of characters that are customizable include head type, body part types (arms, legs, torso, and hands), face types, hair types, and skin types, among others. In some implementations, the accessories that are customizable include clothing (e.g., shirts, pants, hats, shoes, glasses, etc.), weapons, or other tools. In some implementations, the user may also control the scale (e.g., height, width, or depth) of a character or the scale of components of a character. In some implementations, the user may control the proportions of a character (e.g., blocky, anatomical, etc.). It may be noted that is some implementations, a character may not include a character game object (e.g., body parts, etc.) but the user may control the character (without the character game object) to facilitate the user's interaction with the game (e.g., a puzzle game where there is no rendered character game object, but the user still controls a character to control in-game action).

In some implementations, a component, such as a body part, may be a primitive geometrical shape such as a block, a cylinder, a sphere, etc., or some other primitive shape such as a wedge, a torus, a tube, a channel, etc. In some implementations, a creator module may publish a user's character for view or use by other users of the online gaming platform 102. In some implementations, creating, modifying, or customizing characters, other game objects, games, or game environments may be performed by a user using a user interface (e.g., developer interface) and with or without scripting (or with or without an application programming interface (API)). It may be noted that for purposes of illustration, rather than limitation, characters are described as having a humanoid form. In may further be noted that characters may have any form such as a vehicle, animal, inanimate object, or other creative form.

In some implementations, the online gaming platform 102 may store characters created by users in the data store 106. In some implementations, the online gaming platform 102 maintains a character catalog and game catalog that may be presented to users via. In some implementations, the game catalog includes images of games stored on the online gaming platform 102. In addition, a user may select a character (e.g., a character created by the user or other user) from the character catalog to participate in a selected game. The character catalog includes images of characters stored on the online gaming platform 102. In some implementations, one or more of the characters in the character catalog may have been created or customized by the user. In some implementations, the chosen character may have character settings defining one or more of the components of the character.

In some implementations, a user's character can include a configuration of components, where the configuration and appearance of components and more generally the appearance of the character may be defined by character settings. In some implementations, the character settings of a user's character may at least in part be chosen by the user. In other implementations, a user may choose a character with default character settings or character setting chosen by other users. For example, a user may choose a default character from a character catalog that has predefined character settings, and the user may further customize the default character by changing some of the character settings (e.g., adding a shirt with a customized logo). The character settings may be associated with a particular character by the online gaming platform 102.

In some implementations, the player systems (e.g., 110-114) may each include computing devices (e.g., 600) such as personal computers (PCs), mobile devices (e.g., laptops, mobile phones, smart phones, tablet computers, or netbook computers), network-connected televisions, gaming consoles, etc. In some implementations, a player system (e.g., 110-114) may also be referred to as a "user device." In some implementations, one or more player systems (e.g., 110-114) may connect to the online gaming platform 102 at any given moment. It may be noted that the number of player systems (e.g., 110-114) is provided as illustration, rather than limitation. In some implementations, any number of player systems (e.g., 110-114) may be used.

In some implementations, each player system (e.g., 110-114) may include an instance of the game application. In one implementation, the game application may permit users to use and interact with online gaming platform 102, such as search for a game or other content, control a virtual character in a virtual game hosted by online gaming platform 102, or view or upload content, such as games, images, video items, web pages, documents, and so forth.

In one example, the game application may be a web application (e.g., an application that operates within a web browser environment) that can access, retrieve, present, or navigate content (e.g., virtual character in a virtual environment, etc.) served by a web server. In another example, the game application may be a native application (e.g., a mobile application, app, or a gaming program) that is installed and executes on an operating system local to a player system (e.g., 110-114) and allows users to interact with online gaming platform 102. The game application may render, display, or present the content (e.g., a web page, a media viewer) to a user. In an implementation, the game application may also include an embedded media player (e.g., a Flash® player) that is embedded in a web page.

According to aspects of the disclosure, the player systems can execute a game application that may be an online gaming platform application for users to build, create, edit, upload content to the online gaming platform 102 as well as interact with online gaming platform 102 (e.g., search for, select, and play games hosted by online gaming platform 102). As such, the game application may be provided to the player systems (e.g., 110-114) by the online gaming platform 102. In another example, the game application may be an application that is downloaded from a server.

In some implementations, a user may log in to online gaming platform 102 via the game application. The user may access a user account by providing user account information (e.g., username and password) where the user account is associated with one or more characters available to participate in one or more games of online gaming platform 102.

In general, functions described in one implementation as being performed by the online gaming platform 102 can also be performed by the player systems (e.g., 110-114), or a server, in other implementations if appropriate. In addition, the functionality attributed to a particular component can be performed by different or multiple components operating together. The online gaming platform 102 can also be accessed as a service provided to other systems or devices through appropriate application programming interfaces (APIs), and thus is not limited to use in websites.

In some implementations, online gaming platform 102 may include a search engine. In some implementations, the search engine may be a system, application, or module that permits the online gaming platform 102 to provide search functionality to users, where the search functionality permits the users to search for games, game-related content or other content within the online gaming platform 102. In some implementations, the search engine may perform a search and return search results. An example of a search result user interface is shown in FIG. 2.

Figure 2:
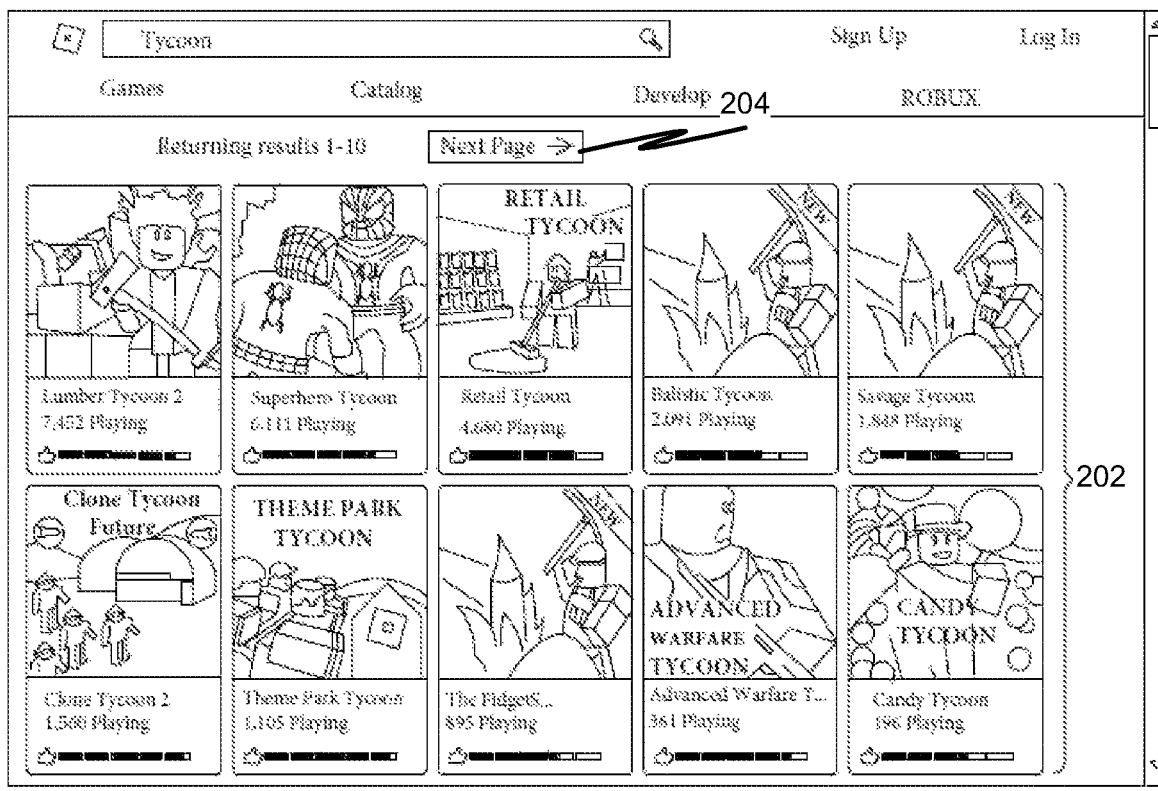
FIG. 2 is a diagram of an example game user interface in accordance with some implementations.

FIG. 2 is an example graphical user interface (GUI) 200 displaying search results 202 ordered according to historical data, in accordance with some implementations. The GUI 200 includes a display of a first portion (e.g., page 1) of search results 202 that have been matched with the search query "Tycoon" and ordered according to some criteria such as historical data (e.g., number of players playing). The GUI 200 includes a user interface navigation element 204 that, when selected, causes a navigation indication or a request to retrieve a next set of results (e.g., page 2, etc.) to be sent from a player system (e.g., 110-114) to a gaming platform (e.g., 102). When the element 204 is selected, the system can send an indication to the gaming platform, indicative of navigation including a request for the next set of results that can optionally include what the next set of results is (e.g., page 2, etc.). When one of the search result elements (e.g., thumbnail icons) in the search results 202 is selected, the game associated with the selected element is downloaded and execution is started so the player can play the game.

In some implementations, the predictive preloading described herein can begin when the search results 202 are determined (e.g., after a search query has been executed on a database and search results have been returned and before those results are displayed) or when the search results are displayed. In some implementations, the preloading can continue until a termination condition is reached. The termination condition can include receiving an indication that the player has made a selection from the displayed results (e.g., 202) and the preloading of any data resources not associated with the selected game (or other game-related data or media item) can be terminated. The preloading can also be terminated when the player navigates away from a given search result page, for example by selecting the next page element 204 or by providing a new search term and causing a new search query to be processed. In some implementations, the termination condition can also include having completed preloading the games or game-related assets identified for preloading. In some implementations, the termination condition can include preloading a threshold number of games/ assets, or consuming a certain amount of memory/network resource. Preloading can be dependent on parameters such as client device, available client-side memory, network capacity between game platform and client, or other factors. These factors can also be supplied to a preloading decision making algorithm. Preloading can be performed on client-side only, server side only, or preloading can be performed on both client side and server side.

The preloading described herein can be performed for pages other than search results. For example, if a player is viewing popular games of the day, week, month, etc., the available game options may include games in an order of popularity, and the preloading corresponds to one or more available game options, e.g., game options that are currently displayed on the player system. In another example, a player may be viewing available selections of any games or game-related data or media and preloading can be performed in connection with the displayed games or game-related data or media items.

Implementations of the disclosed predictive preloading system or method can improve user experience by reducing the latency time period from game selection time to game start time. In some implementations, newer content can be discovered more quickly when the search engine provides for a portion of searches to be based on recency (or other criteria different than historical data such as popularity, number of players, etc.). Some implementations can provide predictions based on a cohort a player is associated with. A cohort can include players share similarities in one or more characteristics such as age group, previous choices (e.g., players that choose x and then choose y), length of time on platform (e.g., both this session and/or total numbers of hours total), avatar type, country of play, time of play, etc.

Some implementations can perform preloading during a time when a user is viewing a graphical user interface but has not made a selection from the interface. By performing predictive preloading during a time when processing load may be low (e.g., when the user is viewing the GUI to make a selection), systems or methods may shift some processing or data communications to a time when the processor and/or communications systems are in a low utilization state, which can improve utilization of processing or communications resources.

Some implementations can include using player information. In such implementations, player permission can be obtained before using player information. A player can be given options to permit or deny use of information associated with the player. In instances where a player has given permission for player information to be used (e.g., for training a model or making a preloading prediction using a model), the player information can be converted or abstracted into a form that removes any player (or user) identifiable information (e.g., by a using a regional location in place of an actual or more detailed location, by using a player age range in place of an actual age, removing player account identification details form account history, etc.). If a player does not provide permission for player data and/or actions to be used, the methods described herein are performed without player data. In some implementations, player data and actions from multiple players that have provided permission can be combined into an aggregate form that does not include identification of any particular players, but rather represents an aggregation of player data and actions (e.g., player data and actions associated with a cohort).

Figure 3:
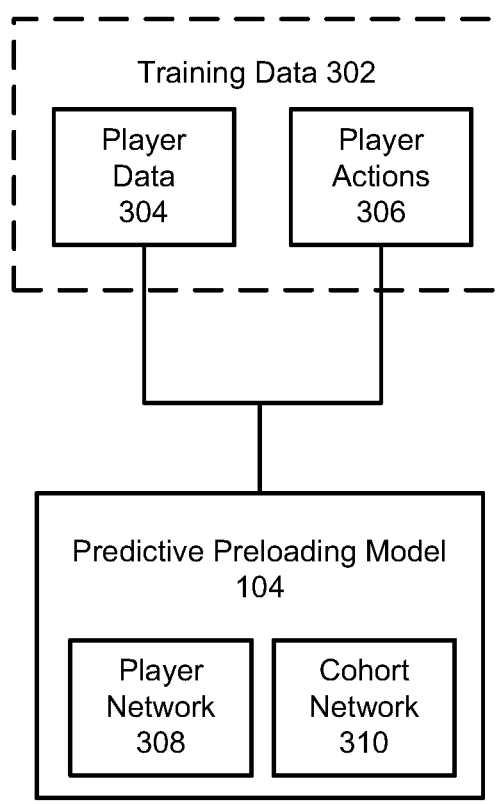
FIG. 3 is a diagram of training a machine learning model to predict game data assets for preloading in accordance with some implementations.

FIG. 3 is a diagram of training a machine learning model to predict game data assets for preloading in accordance with some implementations. As shown in FIG. 3, training data 302 is supplied to the predictive preloading model 104 in a training phase. In various implementations, predictive preloading model 104 can include a machine-learning model (e.g., a neural network such as a convolutional neural network, fully-convolutional neural network, etc.) that can be trained to predict games or game-related data to preload. In some implementations, training data may include player data 304 and player actions 306. The machine learning model can include a model other than a neural network such as a cluster analysis algorithm, support vector machine, or other suitable model.

Player data 304 can include player gender, player age, player geographic region, player language, player experience on the gaming platform, or player purchase history on the gaming platform. Player actions 306 can include previous actions a player has taken and, optionally, context in which the actions were taken. Available game options can include game options available for selection on a GUI when a particular option was selected, game context in which actions were taken (e.g., stage of game play, game type, or game instance), etc. In some implementations, the training data 302 can include a feature vector comprising player demographics, cohort information, play history, current time/location, game level, etc. In some implementations, the training data can include a multidimensional vector with a numeric value for each dimension. Cohorts can be formed or identified based on automatic clustering of the multidimensional vectors. In some implementations, some of the values are simple on or off values, for example male not female. Some are values such as age, which can be grouped together into bins of players within age groups associated with each bin. The type of values used may influence the type of predictive model used. For example, neural networks may tend to perform better with discrete values, whereas cluster analysis techniques perform well with ranges. In some implementations, clustering of values such as age may be used to determine the correct bins to send to the neural network.

The predictive preloading model 104 can include one or more neural networks such as a player network 308 (e.g., a network trained using individual player data) and/or a cohort network 310 (e.g., a network trained using cohort data). The player network 308 and the cohort network 310 can be separate networks or the same network. The training of the model 104 can include player-specific (or user-specific) training of the neural network(s) based on past game choices (e.g., this user usually chooses the most popular game from the search results) or based on past game play (e.g., this user, upon entering a room, usually navigates left). The training can also include cohort-based training such as users in a particular demographic group, upon starting a game, choose accessories of this type (e.g., 21 year old males typically choose a leather jacket and baseball hat; 30 year old females typically choose red hair, and a hair band). Training can also include prior-data training without demographic data (e.g., users choose accessories related to hair first then accessories for footwear). The training approaches mentioned above could include associated weights for predictions (e.g., if three separate models - individual, cohort, and non-demographic—are trained, the individual player model could be assigned greater weight as it is a more personalized model and likely more accurate). In some implementations, the trained model is trained offline and/or online, e.g., if the user selects an option that was preloaded, that can act as positive reinforcement to the model, while if the user chooses a different option, or navigates to a different list of game options, that can serve as negative reinforcement. Online training can permit the machine learning model to dynamically adjust predictions of game options to preload based on (a) more games becoming available; (b) user preferences changing, e.g., some games increase in popularity, some decrease; (c) time of day, day of the week/ other longer term trends, e.g., action games popular at night, strategy games on weekend, etc.; and/or (d) as available game assets change. A cohort may also be defined or identified using a friend graph, where players are connected to other players as friends, the local group might be a cohort, for example all players in 3 hopes from the player in question. Online training permits the system to adjust the selection process over time. For example, there may be 90 million players making choices every week, and by performing online training, a system can keep up with fads or trends in user behavior.

In some implementations, a single neural network can be jointly trained based on all three sets of data (e.g., individual, cohort, and prior-data without demographic information) with weights assigned to training inputs (e.g., higher weight for individual and lowest weight for prior-data without demographic data).

The model form or structure may specify connectivity between various nodes and organization of nodes into layers. For example, nodes of a first layer (e.g., input layer) may receive data as input data or application data. Such data can include, for example, one or more available game options or player data points. Subsequent intermediate layers may receive as input output of nodes of a previous layer per the connectivity specified in the model form or structure. These layers may also be referred to as hidden layers. A final layer (e.g., output layer) produces an output of the machine-learning application. For example, the output may provide one or more game options predicted for preloading.

In some implementations, the trained model may include weighted individual nodes and/or connections. A respective weight may be applied to a connection between each pair of nodes that are connected per the model form, e.g., nodes in successive layers of the neural network. In some implementations, respective weights may be randomly assigned, or initialized to default values. The model may then be trained, e.g., using data, to produce a result, where the training can include adjusting one or more of nodes, node structure, connections, and/or weights.

A model can include a loss function representing the difference between a predicted value and an actual label. The model can be trained to minimize the loss function. Training can include supervised, unsupervised, or semi-supervised learning techniques. In supervised learning, the training data can include a plurality of inputs (e.g., player data and available game options) and a corresponding expected output for each input (e.g., player actions such as selected game options). Based on a comparison of the output of the model with the expected output (e.g., computing the loss function), values of the weights are automatically adjusted, e.g., in a manner that increases a probability that the model produces the expected output when provided similar input (i.e., reduces the loss function). In unsupervised learning, models learn relationships between elements in a data set and classify raw data without the benefit of labeled training data. Semi-supervised learning can include a combination of supervised and unsupervised techniques, for example, a small amount of labeled training data and a large amount of unlabeled training data can be provided to a model for learning. Once the model 104 is trained, it can be used to predict games and game-related data assets to preload based on real-world data.

In some implementations, neural networks (as well as other learning algorithms) tend to produce a weighted set of choices. Some implementations can include performing the training step until the weight for the correct answer is a threshold value larger than the next option. By continually improving the data set, and by discarding incorrect decisions, there may be little down side to shipping any particular network. Performance can be analyzed by tracking how well any particular network is performing over time.

Figure 4:
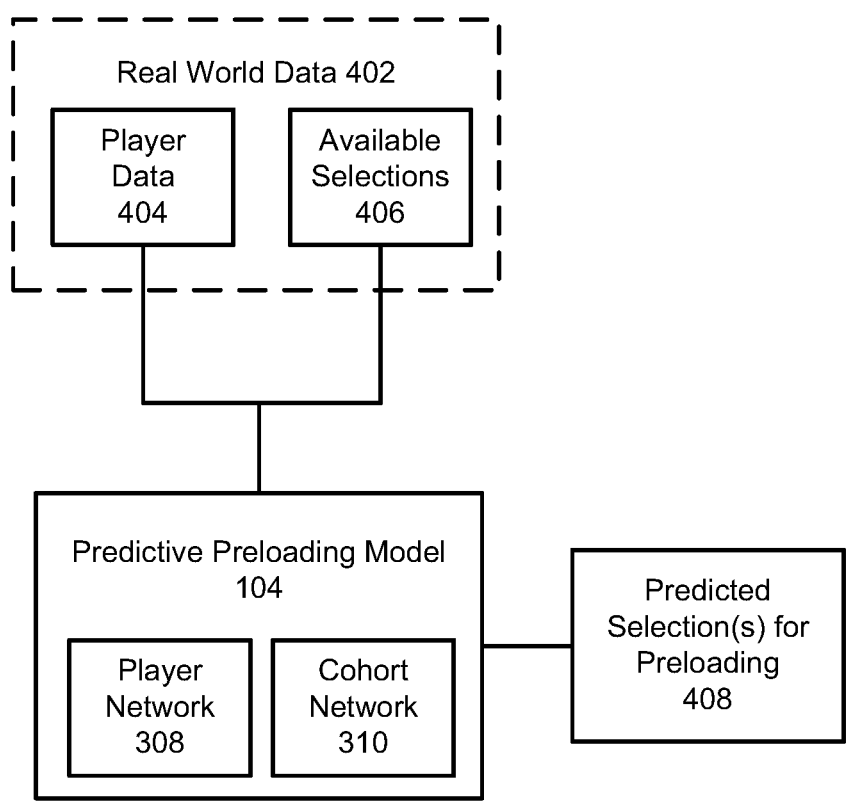
FIG. 4 is a diagram of a machine learning model to predict game data assets for preloading in accordance with some implementations.

FIG. 4 is a diagram of a machine learning model to predict game data assets for preloading in accordance with some implementations. In operation, real world data 402 can be provided to the predictive preloading model 104. In some implementations, real world data can refer to data obtained by a gaming platform during game play or game selection for which predicted preloading is to be performed. The real world data 402 can include player data 404 and available selections 406 (e.g., one or more available game options such as games to play, choices or options within a particular game, etc.).

The predictive preloading model 104 can produce one or more predicted selections 408 for preloading based on the real world data 402 and the player network 308 and/or cohort network 310, which can be separate networks or the same network. The predicted selections for preloading can include games, games resources, game selections (e.g., moves within a game, actions within a game, etc.).

Figure 5:
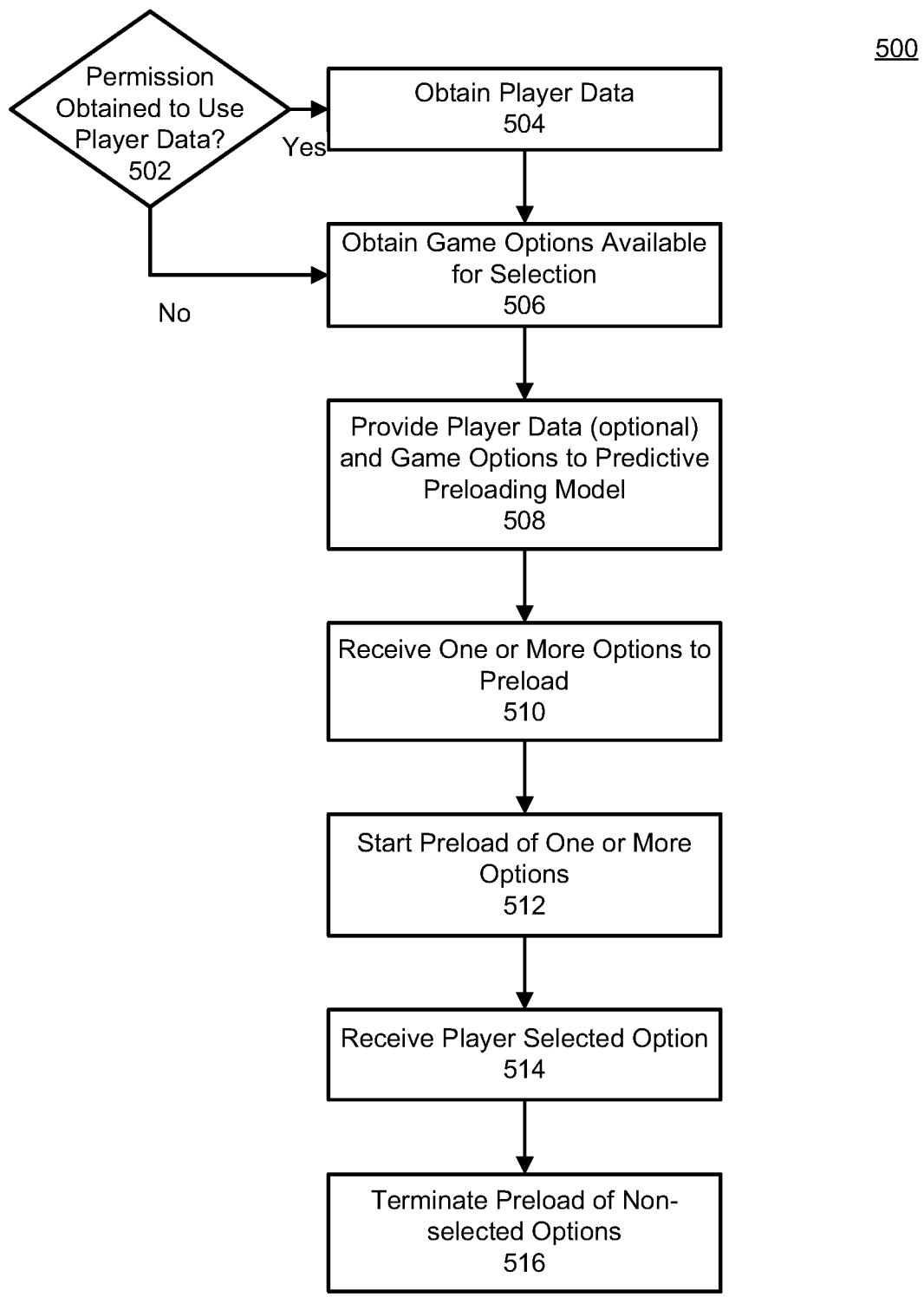
FIG. 5 is a flowchart of an example method to predictively preload game data in accordance with some implementations.

FIG. 5 is a flowchart of an example method 500 to predictively preload game data in accordance with some implementations. Processing begins at 502, where it is determined if a player has provided permission for player data to be used. If so, processing continues to 504. Otherwise, processing continues to 506. If player data is not permitted to be used or if there is insufficient data to perform a preloading prediction or in any situation where the system cannot make a preloading prediction, the system can just fallback to waiting for a player to make a choice.

At 504, player data is obtained. The player data can include player gender, player age, player geographic region, player language, player experience on the gaming platform, or player purchase history on the gaming platform. The player data can also include one or more cohorts the player belongs to, where a cohort includes one or more characteristics that members of the cohort match (e.g., match identically such as male or female, or match within a given range, such as lives near New York City.) The player data can be obtained from information a player provides when creating or updating an account, information collected about the player (with the player's permission) during use of the gaming platform, or the like. Processing continues to 506.

At 506, game options available for selection are obtained. The game options available for selection can include games available for selection to play (e.g., 202 in FIG. 2), items within games, movement or action options available to make within a particular game a player is playing, etc. Processing continues to 508.

At 508, player data (optional) and game options available for selection are provided to a predictive preloading model (e.g., 104). Processing continues to 510.

At 510, one or more game options to preload are received from the predictive preloading model. Processing continues to 512.

At 512, preloading of the one or more game options received in 510 is started. The preloading can be performed on a player system (i.e., client-side) in the background while the player is still viewing a user interface to make a selection, for example. The preloading can be started after the available options are displayed, or, optionally, the preloading can be started as soon as the one or more game options to preload are received from the predictive preloading model, which can be prior to the available options being displayed on a player system. In some implementations, the preloading can include retrieving one or more resources from a gaming platform via a network, loading the one or more resources in a random access memory of the player system, and/or caching the one or more resources at the gaming platform. Processing continues to 514.

At 514, player selection is received or another preloading termination condition is reached. The other termination conditions can include receiving navigation that changes available game options (e.g., next page selection in search results window, receiving a different search query, etc.). Processing continues to 516.

At 516, preloading of any non-selected game options is terminated. Terminating preloading can include stopping preloading and releasing any memory or other resources associated with the terminated preloading games or game-related data assets. Terminating can also include temporarily stopping preloading for a given amount of time such that if a user returns to a user interface screen or program state within the given amount of time and all or a portion of the previous preloading would be performed, then the preloading can be restarted from where it was temporarily paused following receiving the termination condition and prior to discarding any partially preloaded data.

Some implementations can include updating the ML model based on the selection, which can include online training of the model, such as reinforcement learning based on player selection.

Blocks 502-516 (as well as any other blocks shown and described herein) can be repeated in whole or in part and performed in the same or different orders. Moreover, certain blocks can be eliminated, modified, combined with other blocks, and/or supplemented with other operations.

Figure 6:
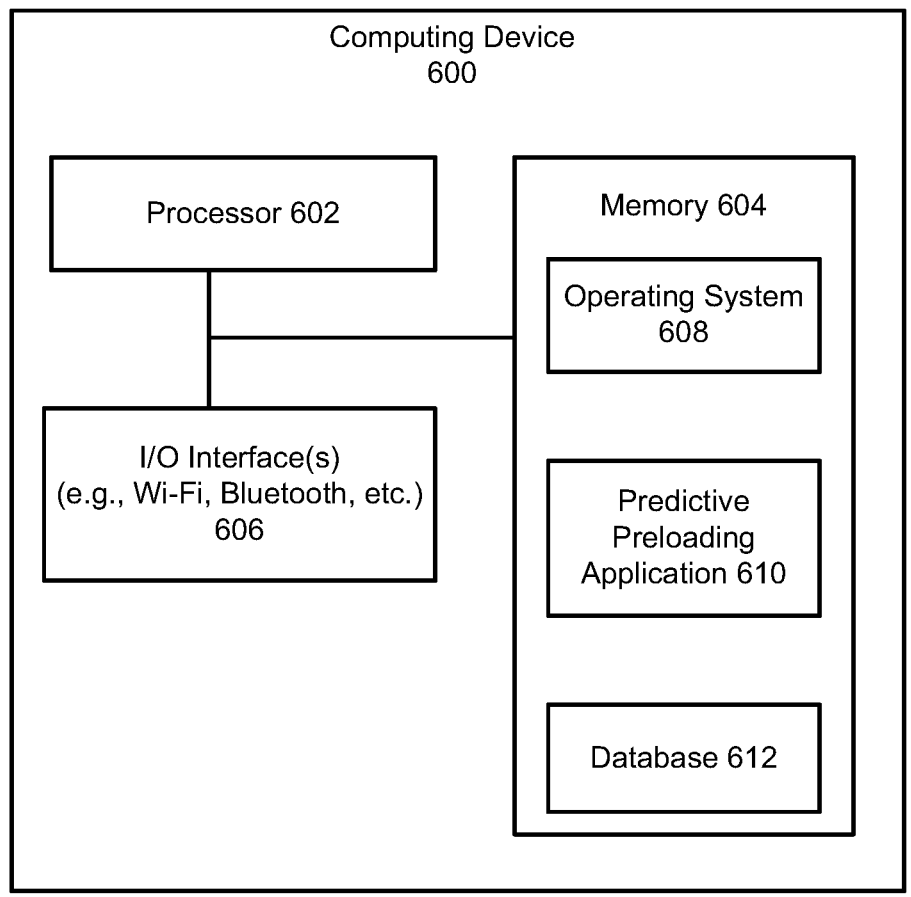
FIG. 6 is a diagram of a computing device configured to predictively preload game data in accordance with some implementations.

FIG. 6 is a block diagram of an example computing device 600 which may be used to implement one or more features described herein. In one example, device 600 may be used to implement a computer device (e.g., 102, and/or 110-114 of FIG. 1) and perform method implementations described herein. Computing device 600 can be any suitable computer system, server, or other electronic or hardware device. For example, the computing device 600 can be a mainframe computer, desktop computer, workstation, portable computer, or electronic device (portable device, mobile device, cell phone, smart phone, tablet computer, television, TV set top box, personal digital assistant (PDA), media player, game device, wearable device, etc.). In some implementations, device 600 includes a processor 602, a memory 604, input/output (I/O) interface 606, and audio/video input/output devices 614.

Processor 602 can be one or more processors and/or processing circuits to execute program code and control basic operations of the device 600. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. Some implementations can include a machine learning processor or other processor (e.g., GPU, ASIC, FPGA, etc.) that is utilized for machine learning model implementation to implement one or more of the machine learning models described herein.

Memory 604 is typically provided in device 600 for access by the processor 602, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 602 and/or integrated therewith. Memory 604 can store software operating on the server device 600 by the processor 602, including an operating system 608, a predictive preloading application 610 and associated data 612. In some implementations, the search engine application 610 can include instructions that enable processor 4602 to perform the functions described herein, e.g., some or all of the method of FIG. 5.

For example, memory 604 can include software instructions for a predictive preloading application 610 that can provide predictive preloading capability within an online gaming platform (e.g., 102) or player system (e.g., 110-114). Any of software in memory 604 can alternatively be stored on any other suitable storage location or computer-readable medium. In addition, memory 604 (and/or other connected storage device(s)) can store instructions and data used in the features described herein. Memory 604 and any other type of storage (magnetic disk, optical disk, magnetic tape, or other tangible media) can be considered "storage" or "storage devices."

I/O interface 606 can provide functions to enable interfacing the server device 600 with other systems and devices. For example, network communication devices, storage devices (e.g., memory and/or data store 106), and input/output devices can communicate via interface 406. In some implementations, the I/O interface can connect to interface devices including input devices (keyboard, pointing device, touchscreen, microphone, camera, scanner, etc.) and/or output devices (display device, speaker devices, printer, motor, etc.).

For ease of illustration, FIG. 6 shows one block for each of processor 602, memory 604, I/O interface 606, software blocks 608 and 610, and database 612. These blocks may represent one or more processors or processing circuitries, operating systems, memories, I/O interfaces, applications, and/or software modules. In other implementations, device 600 may not have all of the components shown and/or may have other elements including other types of elements instead of, or in addition to, those shown herein. While the online gaming platform 102 is described as performing operations as described in some implementations herein, any suitable component or combination of components of online gaming platform 102 or similar system, or any suitable processor or processors associated with such a system, may perform the operations described.

A user device or player system (e.g., 110-114) can also implement and/or be used with features described herein. Example user devices or player systems (e.g., 110-114) can be computer devices including some similar components as the device 600, e.g., processor(s) 602, memory 604, and I/O interface 606. An operating system, software and applications suitable for the client device can be provided in memory and used by the processor. The I/O interface for a client device can be connected to network communication devices, as well as to input and output devices, e.g., a microphone for capturing sound, a camera for capturing images or video, audio speaker devices for outputting sound, a display device for outputting images or video, or other output devices. A display device within the audio/video input/output devices 614, for example, can be connected to (or included in) the device 600 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

One or more methods described herein (e.g., method 500) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method to preload one or more game options by a gaming platform, the method comprising:
   receiving, from a player device and by the gaming platform, a game search request;
   providing player data from the gaming platform and one or more games that match the game search request as input to a trained machine learning model;
   obtaining, as output of the trained machine learning model, one or more game options to preload by the gaming platform, the one or more game options being at least one of the one or more games; and
   causing the player device to preload at least a portion of at least one of the one or more game options prior to receiving user selection input of a particular game of the one or more games, wherein the preloading is performed based upon one or more of: processor utilization, memory utilization, or communications utilization of the player device.

2. The computer-implemented method of claim 1, wherein the causing the player device to preload comprises:
   causing preloading to start at the player device, wherein the preloading includes loading one or more resources corresponding to the one or more game options in a memory of the player device;
   receiving, from the player device, an indication that a termination condition has been met; and
   in response to the indication, causing termination of the loading of the one or more resources at the player system.

3. The computer-implemented method of claim 2, wherein the termination condition includes receiving the user selection input from the player system, and wherein the causing termination includes termination of loading of game options that do not match a game option selection of the user selection input.

4. The computer-implemented method of claim 2, wherein the termination condition includes receiving user input indicative of a change in available game options of the one or more game options, and wherein the causing termination includes termination of loading of game options that do not match the change in the available game options.

5. The computer-implemented method of claim 2, wherein the termination condition includes receiving a new game search request, wherein the causing termination includes termination of loading of game options responsive to receiving the new game search request, and wherein the method further includes causing the player device to preload at least a portion of one or more game options associated with the new game search request prior to receiving user selection input of a particular game.

6. The computer-implemented method of claim 2, wherein the termination condition is any of one or more of: preloading of a predetermined number of the one or more game options, exceeding a predetermined amount of processor utilization at the player device, consumption of a predetermined amount of memory at the player device, or consumption of a threshold amount of a network resource at the player device.

7. The computer-implemented method of claim 1, wherein the one or more game options include one or more available games within the gaming platform that are selectable by a player associated with the player device.

8. The computer-implemented method of claim 1, wherein the one or more game options include one or more available game resources within a particular game in the gaming platform that are selectable by a player associated with the player device.

9. The computer-implemented method of claim 1, further comprising presenting a graphical user interface (GUI) to display the one or more game options selectable by a player within the gaming platform, wherein:
   causing the player device to preload is performed prior to presenting the GUI to the player within the gaming platform;
   causing the player device to preload is performed subsequent to presenting the GUI to the player within the gaming platform; or
   causing the player device to preload is performed while presenting the GUI and prior to receiving the user selection input.

10. The computer-implemented method of claim 1, wherein the player data includes one or more of: player gender, player age, player geographic region, player language, player experience on the gaming platform, player purchase history on the gaming platform, or player activity history on the gaming platform.

11. A computer-implemented method to train a machine learning model to predict game options to preload by a gaming platform, the method comprising:
   receiving training data that includes player data corresponding to a player and one or more previously selected game options that was previously selected by the player in the gaming platform, wherein the one or more previously selected game options were selected from one or more available game options, and wherein the player data comprises a feature vector that is computed based on two or more of: player demographic information, player cohort data, player history, player location, or player game level; and
   training the machine learning model to predict game options to preload, wherein the training comprises:
      providing the player data and the one or more available game options as input to the machine learning model;
      obtaining, as output of the machine learning model, one or more predicted game options;
      comparing the one or more predicted game options with the one or more previously selected game options; and
      adjusting one or more parameters of the machine learning model based on the comparing.

12. The computer-implemented method of claim 11, wherein the training comprises one or more of: supervised learning or semi-supervised learning techniques.

13. The computer-implemented method of claim 11, wherein the training is performed until a value of a loss function meets a predetermined criterion, and wherein the loss function is a function of the predicted game options and the previously selected game options.

14. The computer-implemented method of claim 11, wherein the machine learning model is a neural network, and wherein the method further comprises:
   determining a cohort that the player is associated with; and
   training the neural network, with additional player data corresponding to additional players from the cohort, to predict one or more game options to preload.

15. A non-transitory computer-readable medium with instructions stored thereon that, responsive to execution by a processing device, causes the processing device to perform operations including:
   receiving, from a player device and by a gaming platform, a game search request;
   providing player data from the gaming platform and one or more games that match the game search request as input to a trained machine learning model;
   obtaining, as output of the trained machine learning model, one or more game options to preload by the gaming platform, the one or more game options being at least one of the one or more games; and
   causing the player device to preload at least a portion of at least one of the one or more game options prior to receiving user selection input of a particular game of the one or more games, wherein the preloading is performed based upon one or more of: processor utilization, memory utilization, or communications utilization of the player device.

16. The non-transitory computer-readable medium of claim 15, wherein the causing the player device to preload comprises:
   causing preloading to start at the player device, wherein the preloading includes loading one or more resources corresponding to the one or more game options in a memory of the player device;
   receiving, from the player device, an indication that a termination condition has been met; and
   in response to the indication, causing termination of the loading of the one or more resources at the player system.

17. The non-transitory computer-readable medium of claim 16, wherein the termination condition includes receiving the user selection input from the player system, and wherein the causing termination includes termination of loading of game options that do not match a game option selection of the user selection input.

18. The non-transitory computer-readable medium of claim 15, wherein the one or more game options include one or more available games within the gaming platform that are selectable by a player associated with the player device.

19. The non-transitory computer-readable medium of claim 15, wherein the one or more game options include one or more available game resources within a particular game in the gaming platform that are selectable by a player associated with the player device.

\* \* \* \* \*